United States Patent [19]

Gerlt

[11] 4,400,161
[45] Aug. 23, 1983

[54] GRAPHIC DISPLAY AND TONAL VALUE DETERMINATOR

[76] Inventor: Roy R. Gerlt, Clinton Woods, Tuxedo Park, N.Y. 10987

[21] Appl. No.: 341,251

[22] Filed: Jan. 21, 1982

[51] Int. Cl.³ .............................................. G09B 1/22
[52] U.S. Cl. ...................................... 434/104; 190/11; 206/45.18; 206/45.2; 206/81; 248/447
[58] Field of Search ...................... 434/81, 96, 98, 101, 434/102, 103, 104, 402, 404; 190/11; 206/81, 45.18, 45.2, 45.22, 45.24; 248/441 R, 447, 451, 456, 457, 460, 461

[56] References Cited

U.S. PATENT DOCUMENTS

| | | | |
|---|---|---|---|
| 2,091,260 | 8/1937 | Farkas et al. | 248/447 X |
| 2,253,107 | 8/1941 | Brooks | 434/102 |
| 3,136,082 | 6/1964 | Sloves | 248/447 X |
| 3,177,991 | 4/1965 | Walker | 190/11 |
| 3,229,385 | 1/1966 | De Pauw | 434/98 |
| 4,199,877 | 4/1980 | Akiyama | 434/104 |
| 4,241,520 | 12/1980 | Norton | 434/102 |

*Primary Examiner*—William H. Grieb
*Attorney, Agent, or Firm*—McGlew and Tuttle

[57] ABSTRACT

A device for determining tonal values of a graphic display comprises a mounting support which has a reference pin thereon and a positioning pin spaced away from the reference pin for example a radial line. A plurality of indicator members preferably in the form of wheels are provided and each of them includes a reference pin receiving opening to permit them to be rotatably mounted on a reference pin. In addition they include a plurality of circumferentially arranged defined images or word displays which have distinct characteristics in respect to tone or tint or color. The wheel is rotatable to present any one of defined areas with images or wording in a selected position for example an upright position for viewing. Each wheel also has a positioning pin engaging opening which may be engaged over a positioning pin defined on the support. This gives a selected orientation of one wheel and one or more additional wheels may be superimposed on the one wheel. The additional wheels are similarly oriented in order to provide a combined effect of tone, tint and color for ready viewing and appraisal.

16 Claims, 6 Drawing Figures

GRAPHIC DISPLAY AND TONAL VALUE DETERMINATOR

FIELD AND BACKGROUND OF THE INVENTION

This invention relates in general to the graphic arts including printing and photography and in particular to a new and useful device for the visual appreciation and selection of tonal values for multicolor half tone-tint combinations and other special effects for reproduction.

At the present time devices are known wherein various tints of individual colors may be superimposed in order to combine certain percentages or tints of colors with one another so as to achieve a desired color effect which thereafter may be printed or photographed in the percentages of the tints or colors which have been lined up. One difficulty with the known devices is that they do not provide any means for tonal evaluation nor do they provide means for effecting a complete individual appraisal of how a basic image or copy display or combination thereof would appear before the actual photographing or printing is carried out.

It has been found that there is a great need to obtain an evaluation of not only combinations of colors or tints of colors but to also provide an evaluation of tonal variations such as those which are produced by screens and the like and various highlighting techniques before the actual photography or printing takes place.

SUMMARY OF THE INVENTION

In accordance with the invention there is provided a device for visually determining tonal values of a graphic display along with various other combinations of colors and tints of color and arrangement of copy alongside of images and to fully evaluate masking and highlighting techniques for reproduction of the effect if carried on to any large scale.

In accordance with the invention there is provided a device for readily determining values of a graphic display which includes a plurality of wheel elements at least some of which are transparent which are mounted on a support which has a centering pin for the wheel elements so that they may be rotated thereon in order to position selected image area in a selected location for example at the topmost portion of the wheel. With the inventive device the support is embodied in a case having a cover which may be folded outwardly from a box-like container portion carrying the wheels and which includes a support panel having the rotatable support pin for the wheels which may be oriented in an easel fashion by propping it against a groove portion of the cover for the folder containing the wheels.

In accordance with a preferred form of the invention the inventive device includes five separate folders of colors which are defined at circumferentially arranged areas or segments of the wheels which are advantageously made of the transparent material such as polyester. Each folder for example advantageously includes several colors for example eight colors such as yellow, magenta, cyan, red, blue, green, brown, orange and also black and white wheels and black outline wheels or highlighting wheels. The construction is such that one of these wheels may be mounted on a centering pin which permits their rotation about the pin and one or more additional wheels which are transparent may be mounted on the same pin overlying the first wheel. Various circumferentially spaced images or copies on the individual wheels may be positioned so that any combination of tonal values as well as color may be oriented so that they are superposed and given an overall image to be viewed for evaluation purposes. In addition to the wheels containing the various tints of the individual colors there are wheels which include for example white or black tonal value or highlighting images which may be superposed.

Each folder also advantageously includes a mask wheel which may be selected for varying tonal characteristics. The various folders containing the wheels are advantageously carried in the novel case which includes a container base portion having a top panel with an upwardly foldable flap to facilitate removal of wheels from the container base portion or folders which contain the wheels. A further outer cover flap is hinged to the container portion and overlies the top face of the container portion or cover when in a closed position. Hinged to the top outer edge of the top flap is an easel flap having an outer edge which may be propped against the fold line of the panel of the top cover of the container portion. In this easel display position the outer flap provides a mounting base or support for the arrangement and viewing of the various combinations of wheel elements.

Accordingly it is an object of the invention to provide an improved device for determining values such as tone, color and highlights of a graphic display which comprises a reference mounting support which has a reference pin thereon with a positioning pin on the support spaced away from the reference pin and a plurality of indicator members associated with the support including at least one which is transparent and which have a reference pin receiving opening engageable over the positioning pin on the support and rotatable thereon, each of the indicator members having a plurality of defined images arranged in separate or distinct areas thereon and which are of distinct characteristics, for example of various color values or various tonal values or masking or highlighting values, all of the wheels being rotatable on the pin support to position them in relative positions which give a view of an image at at least one location thereon with all of the selected tonal values, color values, masking values and highlight values.

A further object of the invention is to provide a device for displaying tonal values which comprises a container having a container base portion with a cover flap having a foldable end portion defining an easel propped on the top of the base portion and having means for rotatably mounting a plurality of indicator members which include transparent portions which may be aligned when superimposed to define selected graphic display value.

A further object of the invention is to provide a device for determining values of a graphic display and to a container device for holding graphical display elements which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

GENERAL DESCRIPTION OF PREFERRED EMBODIMENTS

Figure 1:
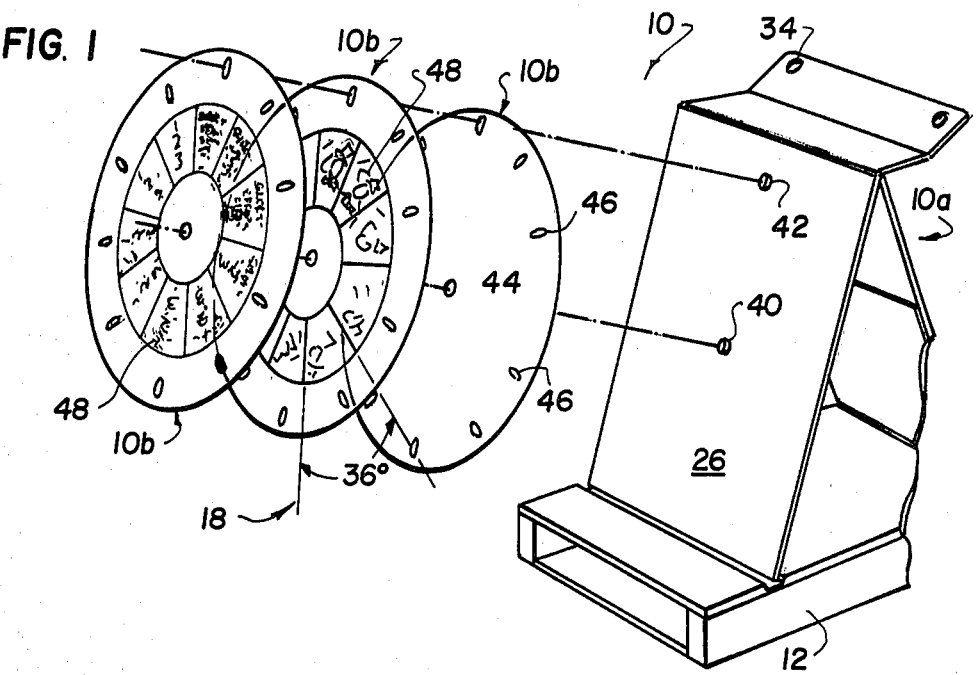
FIG. 1 is an exploded front top perspective view of a container and display device constructed in accordance with the invention.

Referring to the drawings in particular the invention embodied therein comprises a device for determining values of a graphic display which is generally designated 10 and includes a container portion generally designated 10a and an indicator member portion generally designated 10b.

In accordance with the invention the container portion 10a comprises a container base 12 having a top closure wall 14 with a fold groove 16 extending across the closure wall from one side to the other. The groove 16 separates a rear closure panel portion 18 from a front closure panel portion 20. The front closure panel portion 20 is pivoted about the groove 16 on the rear panel portion 18. An outer top cover 22 for the container is hinged at its inner end to the rear end of the container at the location of the rear closure panel portion 18. The outer top cover 22 includes a flap 22a which is secured to an inner face which defines a pocket 24 for carrying an indicating member 10b.

In accordance with a feature of the invention an easel display support panel 26 has an inner end which is pivoted to the outer end of the top cover 22 and an outer end terminating in an edge 28 which is adapted to engage in and be propped by the fold groove 16. The cover 22 may be closed by folding the easel display support panel over the flap 22a and folding the cover downwardly against the rear closure panel 18 and the front closure panel 20. The front end of the container 12 advantageously includes an opening 30 which may be closed by folding over a combined closure and carrying flap portion 32 having closure fasteners 34 which may be hinged to the bottom of the container 12. A handle 36 is provided for carrying the device around. The container is advantageously constructed so as to contain five folders 38 each of which carries a plurality of indicating members 10b.

In accordance with another aspect of the invention there is provided the device for determining values of a graphic display, such as tonal values, color values, tint values, copy compatibility, highlighting, masking, etc. and which comprises the easel dislay support panel 26 having a reference pin 40 which in the embodiment shown is centered on the panel and projects outwardly therefrom and defines the support axle. At least one positioning pin 42 is located on the support panel 26 at a spaced location from the reference pin 40 for example along a radial line directly thereabove. A plurality of indicating members 10b are constructed to include a reference pin receiving opening 44 permitting each indicating member to be inserted upon the reference pin 40 and rotated thereon. In addition each indicating member includes one or more positioning pin receiving openings 46. The positioning pin receiving openings are advantageously spaced circumferentially around the periphery of the indicating members 10b and a selected one of them is adapted to engage over the positioning pin 42 when the indicating member is positioned on the support 26. The indicating members contain for example segmental areas 48 imprinted thereon and arranged as individual segments disposed in a circumferential series therearound. Segmental areas 48 contain for example copy or written legends and the tone of this copy varies in value proceeding circumferentially around the indicating member. This variation in value may be one of tone value which may be effected by single or multicolor half tones or tint combinations as well as by special highlighting and masking effects.

Thus as shown in FIG. 1 when a indicating member 10b is positioned so that it is rotatable on the pin 40 it may be oriented in a circumferential manner by engagement of a positioning pin receiving opening 46 onto a positioning pin 42 so as to orient a particular image, color, or masking or highlighting portion of an image imprinted thereon in a fixed position. A second indicating member 10b for example one which has segmental areas 48 which contain a pictorial representation shown with a variation of tonal, tint or color variation pg,8 proceeding circumferentially, is placed on the reference pin support axle so as to overlie the first indicating member 10b it may be oriented to provide a selected combination of an image with the underlying indicating member 10b. Similarly when the outermost one of the wheels 10b is applied over the other two the selected value or image may be made by a combination of the indications of all three indicating members 10b.

Figure 3:
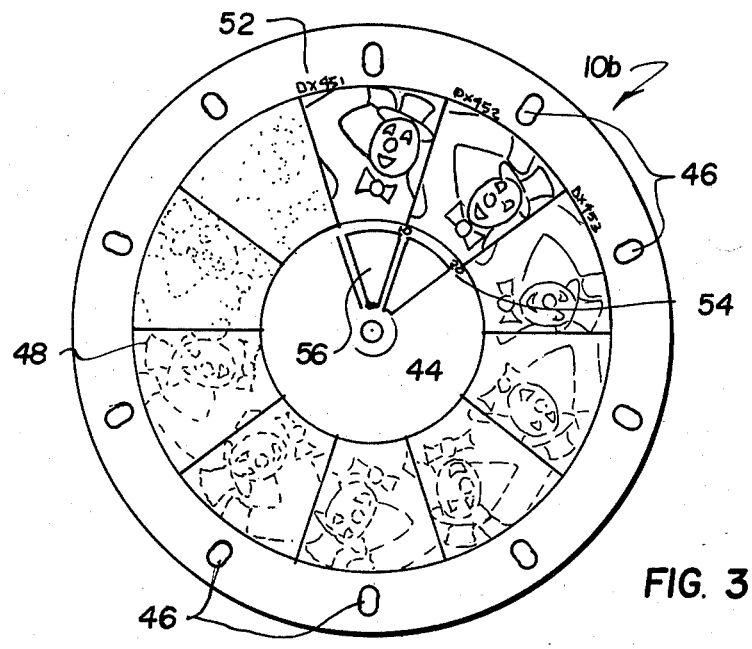
FIG. 3 is a front elevational view of one type of indicating member.
Figure 4:
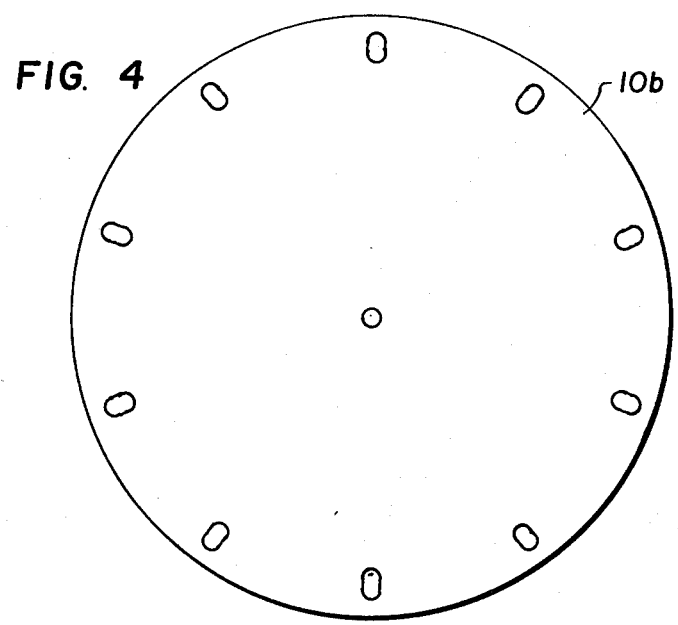
FIG. 4 is a view similar to FIG. 3 indicating an indicating member having one uniform color.

By way of example as shown in FIG. 3 one of the indicating members 10b includes segmental areas 48 which have pictorial images thereon of varying composition for example each wheel may include four half tone images of different tonal ranges which for example may be photographed through a 150 line magenta screen. Others of the images may also include for example three half tones of different tonal values photographed through a fine mezzo tone screen and also three half tones of different tonal ranges photographed through a fine grain tone screen. The same sort of arrangement may be made with a solid color wheel 10b as shown in FIG. 4 or with line copy as shown in respect to the color wheel 10b of FIG. 5. With the indicating member 10b shown in FIG. 5 it advantageously may include 150 line half tones or screen tints. The indicating member 10b shown in FIG. 6 is advantageously one which includes transparent areas 48' and opaque areas or semi-opaque areas 50. Such an indicating member may be used for masking or highlighting for example. Each indicating member 10b advantageously is made of a transparent material and in the form of a wheel and advantageously includes a one quarter inch reference pin receiving opening and positioning openings 46 in the form of 3/16th by ⅜ inch holes. In the case of the indicating member 10b shown in FIG. 3 color or tone designations are printed as shown at 52 so that they will be visible when the various indicator wheels are superposed in a correct combination to give the desired graphic display evaluation. Additional tonal or color or tint evaluations are advantageously imprinted at locations 54 in respect to segmental areas 56 which may also be provided on the indicator members 10b. All of this information may be easily read after the wheels are superposed and positioned to achieve the desired graphic display.

Figure 2:
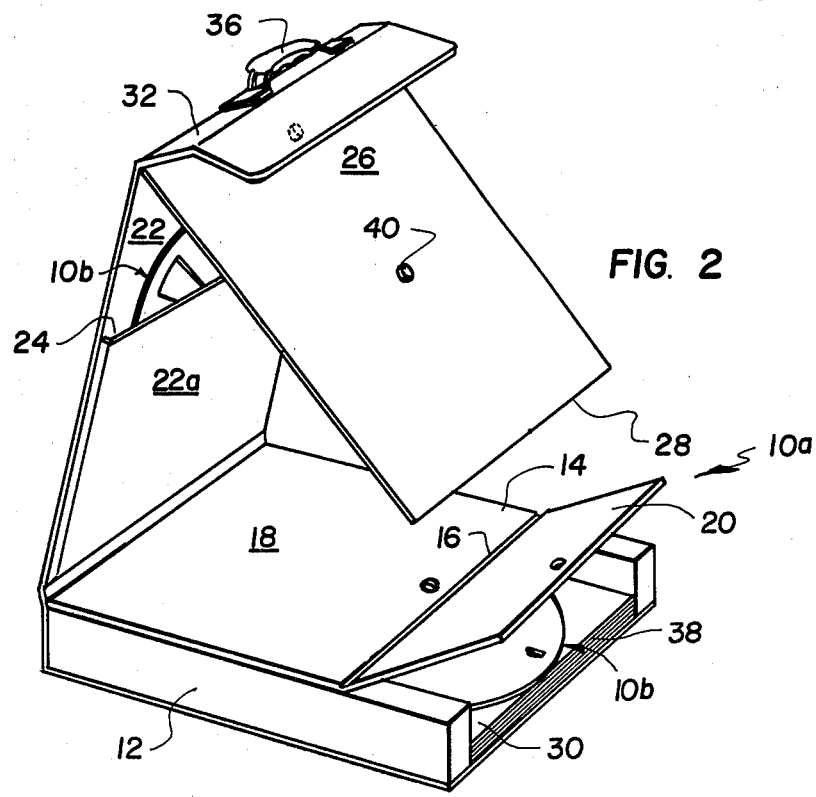
FIG. 2 is a front top perspective view of the container shown in FIG. 1.

In a preferred arrangement of the invention the container 12 shown in FIGS. 1 and 2 is sized to contain five folders 38 and is designed to give an evaluation for multicolor halftone, tint and color combinations plus special effects. The arrangement of screens for half tones, mezzo tones and grain tones and up to nine different color variations plus black and white highlighting for special effects may be all arranged to give a desired control of the eventual graphic display value. Each of the five folders advantageously includes colors defined on polyester wheels or transparent mountings of the following colors: (1) yellow, (2) magenta, (3) cyan, (4) red, (5) blue, (6) green, (7) brown, (8) orange, (9) black. Two folders also have an additional white type wheel as shown in FIG. 4 and a black type outline wheel as shown in FIG. 6. The wheel shown in FIG. 6 also may comprise a selection mask wheel. Each folder advantageously can hold up to twelve 0.003 color polyester base wheels of twelve inch diameter.

Advantageously a first folder for half tones, mezzo tones, and grain tones. Each color wheel in such case contains one subject photographed through different half tone screens to produce the following:

Four half tones of different tonal ranges photographed through 150 line magenta screen; three half tones of different tonal values photographed through a fine mezzo tone screen; and three half tones of different tonal ranges photographed through a fine grain tone screen.

A second folder for tints advantageously includes ten segments 48 graduated with flat tint tonal values of 150 line screen. In this latter case as shown in FIG. 5 a percentage value is designated at locations 58 and such percentage values run as follows: 5%, 10%, 20%, 30%, 40%, 50%, 60%, 70%, 80%, and solid.

Figure 5:
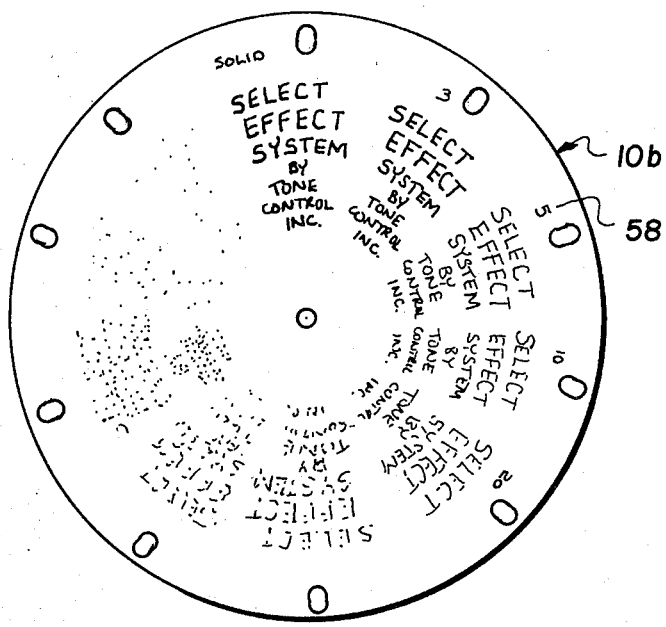
FIG. 5 is a view similar to FIG. 3 of another type of indicating member for copy.
Figure 6:
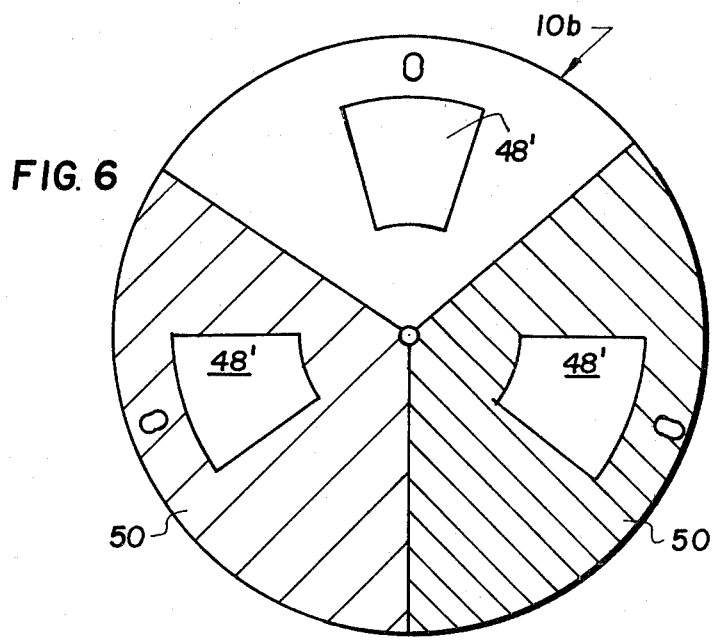
FIG. 6 is a view similar to FIG. 3 of another type indicating member for masking and highlighting.

There is a third type of folder which carries ten segments of each wheel designated 48 which contain identical type matter or copy as shown in FIG. 5 which is gradated with flat tint tonal values of 150 line screen. The percentage value runs the same as mentioned with respect to the second folder. In addition to the standard nine colors, such a set contains a white type wheel such as shown in FIG 4 identically positioned to the tinted type wheels plus a black type outline wheel similarly positioned.

The further folder designated number 4 is provided for tints and special effects. The segments 48 of each of these wheels are divided into five tonal values each of mezzo tone and grain tone screens. The values of each screen are identified by the letters A, B, C, D and E. The values closely approximate a range of 10% through 70%. Each letter is preceded by an M or G to identify the screen. In addition to the standard nine colors this set contains a white type wheel identically positioned to the printed type wheels plus a black type outline wheel similarly positioned.

The white type wheel can be used to display reverse type on a flat tint background or on a color half tone or it can be used as an underplay to determine type color against a previously determined background color. The black type outline wheel provides additional options.

The selection mask wheel shown in FIG. 6 is a 0.005 polyester base material that is silk screened one third each white, grey and black with each color having a clear viewing window 48'. Its use will always provide three separate choices for background selection.

The container shown in FIG. 2 is advantageously made to accommodate the five folders as well as additional material. It is advantageously covered in a heavy brown scuff resistant leatherette material. The handle 36 makes it easy to carry to a place of use. Support surface 26 is advantageously provided with a white finish and forms an integral part of the carrying case. Selection of effects is determined by rotating the various indicator members 10b until the desired superposed arrangements are achieved and each wheel is fixed by placing the positioning pin receiving openings over the associated positioning pin 42.

While specific embodiments of the invention have been shown and described in detail to illustrate the application of the principles of the invention, it will be understood that the invention may be embodied otherwise without departing from such principles.

What is claimed is:

1. A container for graphic displays, comprising a container base having a top closure wall with a fold groove extending thereacross at a spaced location from one end of said top closure wall and defining a rear closure panel portion on one side of said groove and a front closure panel portion on the opposite side of said groove which is pivoted to said rear closure panel portion, an outer top cover having an inner end pivoted to said container base adjacent the rear end thereof and an opposite outer end, and an easel display support panel having an inner end pivoted to said outer end of said top cover and an outer end adapted to engage in and be propped by said fold groove.

2. A container according to claim 1, wherein said outer top cover has an inner face, a flap secured over said inner face and defining with said inner face a receiving pocket.

3. A container according to claim 1, wherein said container includes a front open end opposite to said rear end and an open end closure flap pivoted to said top cover adapted to close over the outer end of said container.

4. A container according to claim 1, including a handle connected to said container base for carrying said container.

5. A container according to claim 1, wherein said easel display support panel has a positioning pin projecting outwardly therefrom defining an indicating mounting member support axle, and an indicating mounting member rotatably mounted on said positioning pin, said indicating member having a plurality of defined images arranged in separate areas thereon and being of distinct characteristic in respect to at least one of: tone, tint and color, said indicator member being rotatable to position a desired image in a viewing position and positioning means for positioning said member in a fixed position for viewing.

6. A container according to claim 1, including a reference pin defining a support axle on said easel display support panel, a plurality of indicator wheels each having a support axle receiving opening engaged through the opening on said support axle, each of said indicator wheels having a plurality of defined images thereon of distinct graphic display value, said wheels being rotatable to position a desired combination of images of adjacent wheels in superimposition, said wheels being transparent so that superposed images may be viewed for value purposes.

7. A device for determining tonal values of a graphic display, comprising a reference mounting support having a reference pin thereon, a positioning pin on said support spaced away from said reference pin, and a plurality of indicator members at least one of which is transparent and each having a reference pin receiving opening and being positionable on said pin for rotation thereon, each of said indicator members having a plurality of defined images arranged in separate areas thereon and which are of distinct characteristic in respect to at least one of: tone, tint and color, each said indicator member being rotatable on said reference pin and having a plurality of circumferentially spaced positioning pin engaging openings which may be selectively engaged on said positioning pins so as to provide a selected orientation of the selected defined images thereon, said wheels being superimposable on said reference pin whereby selected images of selected wheels may be aligned for viewing of tonal, tint and color variations as a combined image appearing through preoriented superposed transparent indicator members.

8. A device according to claim 7, wherein said mounting support comprises a panel portion of a container including a base container portion for carrying said indicator members, a cover pivotally mounted on said base and an easel display support panel pivoted to said cover and comprising said mounting support.

9. A device according to claim 7, wherein said indicator members comprise a polyester wheel and there are a plurality of such wheels of different colors.

10. A device according to claim 9, wherein said wheels include a white type wheel.

11. A device according to claim 9, wherein said wheels include a black type outline wheel.

12. A device according to claim 9, wherein said wheels include a selection mask wheel.

13. A device according to claim 7, wherein said wheels have a plurality of half tones of varying range 8 through 150 line magenta screen.

14. A device according to claim 7, wherein said wheels include defined images comprising copy.

15. A device according to claim 14, wherein said defined images comprise half tones made through fine mezzo tone screens.

16. A device according to claim 7, wherein said images include half tones made through fine grain tone screens.

* * * * *